United States Patent
Biver et al.

(10) Patent No.: US 8,029,135 B2
(45) Date of Patent: Oct. 4, 2011

(54) POLARIZED AND ABRASION-RESISTANT OPTICAL ARTICLE AND PROCESS FOR MANUFACTURING THEREOF

(75) Inventors: Claudine Biver, Charenton le Pont (FR); Sylvette Maisonnier, Auzay (FR); Thomas Bachels, Allschwill (CH); Noémie Lesartre, Charenton le Pont (FR)

(73) Assignees: Essilor International (compagnie Generale D'optique), Charenton le Pont (FR); Rolic AG, Zug (CH)

( * ) Notice: Subject to any disclaimer, the term of this patent is extended or adjusted under 35 U.S.C. 154(b) by 921 days.

(21) Appl. No.: 11/568,602

(22) PCT Filed: May 4, 2005

(86) PCT No.: PCT/EP2005/005789
§ 371 (c)(1),
(2), (4) Date: Aug. 17, 2007

(87) PCT Pub. No.: WO2005/109049
PCT Pub. Date: Nov. 17, 2005

(65) Prior Publication Data
US 2007/0285616 A1    Dec. 13, 2007

(30) Foreign Application Priority Data
May 7, 2004  (EP) .................................... 04291188

(51) Int. Cl.
*G02B 1/08*  (2006.01)
*B05D 5/06*  (2006.01)
*G02C 7/12*  (2006.01)

(52) U.S. Cl. .................. 351/177; 359/491; 427/163.1
(58) Field of Classification Search .................. 351/177; 359/491; 427/163.1
See application file for complete search history.

(56) References Cited

U.S. PATENT DOCUMENTS

| 6,514,574 B1 | 2/2003 | Valeri et al. | |
| 2005/0151926 A1* | 7/2005 | Kumar et al. | 351/163 |
| 2007/0146887 A1* | 6/2007 | Ikeda et al. | 359/586 |

FOREIGN PATENT DOCUMENTS

EP   1256602   11/2002

* cited by examiner

*Primary Examiner* — Thao T. Tran
(74) *Attorney, Agent, or Firm* — Occhiuti Rohlicek & Tsao LLP

(57) ABSTRACT

The invention relates to polarized and abrasion-resistant article comprising: a) a polarized layer applied to a substrate, said polarized layer including an oriented liquid crystal polymer layer (LCP) including at least one dichroic dye, said liquid crystal layer being coated on a photo-orientation layer, and b) an abrasion-resistant coating applied to the polarized layer on said substrate. The invention also relates to a process for manufacturing said articles, and to the use of the above-mentioned article for the manufacturing of optic glasses or lenses.

12 Claims, No Drawings

POLARIZED AND ABRASION-RESISTANT OPTICAL ARTICLE AND PROCESS FOR MANUFACTURING THEREOF

CROSS-REFERENCE TO RELATED APPLICATIONS

This application is the National Stage of International Application No. PCT/EP2005/005789, filed on May 4, 2005, which claims the priority to European Patent Application Serial No. 04291188.3, filed on May 7, 2004. The contents of both applications are hereby incorporated by reference in their entireties.

FIELD OF THE INVENTION

The invention relates to a polarized and abrasion-resistant article and to a process for making a polarized and abrasion-resistant coating onto a suitable substrate, for example a mineral or organic glass.

BACKGROUND OF THE INVENTION

Abrasion-resistant coatings applied to substrates are already described in the prior art. For example, U.S. Pat. No. 4,211,823 or EP 0 614 957 describes abrasion-resistant coating compositions containing hydrolyzed silanes and aluminum compounds, and coated articles resistant to abrasion and impacts. U.S. Pat. Nos. 5,316,791, 6,503,631 and 6,489,028 describe a combined bi-layer impact-resistant and anti-abrasion system, comprising respectively a primer coating of cured polyurethane or poly(meth)acrylic latex or latex containing butadiene units to which an abrasion-resistant coating as described hereinbefore is applied. The latex may also be a photochromic latex, as described in EP 1 161 512 or FR 2 811 322. Such latex may improve the impact resistance of the article to which it is applied and also may give photochromic properties to said article.

Polarized glasses are also well-known in the state of the art for their ability to eliminate the glare produced by the reflection of light due to snow, sea surface, wet roads etc . . . , and to protect the eye itself. U.S. Pat. No. 5,602,661 describes an optical component comprising an orientation layer of photo-orientable polymer (LPP), which is irradiated and in same time cross-linked with polarized light, and an anisotropic film of cross-linked liquid crystal (LCP) material monomers wherein local orientation of the liquid crystal molecules is induced by the orientation of the (LPP) layer.

Usually, polarized layers are coated onto the substrate, by means of an adhesive layer applied between the substrate and the polarized layer. The addition of adhesive is, at the industrial scale, a cost-consuming and a technically fastidious step. Furthermore, this technology is very difficult to use on curved surfaces and it usually needs a thermoforming step of the polarized film.

SUMMARY OF THE INVENTION

The present invention intends to remedy this situation and proposes a new generation of coated articles, being both polarized and abrasion-resistant, in which the presence of an adhesive between the substrate and the polarized layer may be avoided. Furthermore the said coated articles exhibit optical properties with high quality which are particularly interesting when said articles are optical lenses and more specifically ophthalmic lenses. Indeed, the application of the polarized and abrasion-resistant layers as described in the present application on optical substrates allows to get optical lenses with a relative transmission factor in the visible ($T_v$) comprised from at least 80% to 6% associated to a contrast ratio which is superior to the one usually observed and which is at least superior to 8, preferably at least superior to 50, and more preferably at least superior to 100. The present invention also relates to optical lenses complying with all categories (from filter category 1 to 4) of the standardized international definition used to classify lenses based on their light transmission.

By polarized layer, in the meaning of the present invention, is meant one layer containing oriented liquid crystals (LCP), and one photo-orientation layer.

By abrasion-resistant coating, in the meaning of the invention, is meant an abrasion-resistant monolayer or an abrasion-resistant multilayer which comprises from two to four layers, preferentially two or three layers, and more specifically a bi-layer. More details related to this abrasion-resistant coating will be defined in the following description.

By substrate, in the meaning of the invention, is meant all mineral or organic glasses which may optionally be coated with a tinted coating, with a photochromic coating, with a protective coating (to resist for example to the solvent's degradation), or with an abrasion-resistant coating. This last coating is preferentially applied when the substrate is an organic substrate based on polycarbonate polymers. It is also understood that the substrate of the invention may be all mineral or organic glasses in which the photochromic or tinted function is included in the material of substrate itself.

More precisely, the invention relates to a polarized and abrasion-resistant article comprising:

a) a polarized layer applied to a substrate, said polarized layer including an oriented liquid crystal polymer layer (LCP) comprising one or more dyes of which at least one is a dichroic dye, and optionally additives, said liquid crystal layer being placed on a photo-orientation layer, and b) an abrasion-resistant monolayer or multi-layer coating overlaying the polarized layer.

In a preferred embodiment of the invention, the article is an ophthalmic lens. In such case, the substrate of the said lens may be mineral glass and also organic glass made of, for example, polycarbonate, polyamide, polyimide, polysulfone, copolymer of polyethyleneterephthalate and polycarbonate, polyolefines, like polynorbornene, polymer and copolymer of diethylene glycol bis(allylcarbonate), polymer and copolymer of (meth)acrylic like polymer and copolymer of bisphenol-A-(meth)acrylic, polymer and copolymer of thio(meth)acrylic, polymer and copolymer of urethane and thiourethane, polymer and copolymer of epoxy, and polymer and copolymer of episulfure.

According to a particular embodiment, the article of the invention comprises a polarized layer which may include at least a photo-orientation layer and a subsequent layer of cross-linked liquid crystal polymer (LCP) including one or more dyes of which at least one is dichroic, and a further abrasion-resistant coating which is a monolayer or a multi-layer. In a preferred embodiment of the invention, the further abrasion-resistant coating is selected from a monolayer and a bi-layer.

Advantageously, the polarized layer has a thickness comprised from 1 to 20 μm, preferably from 3 to 8 μm.

The polarized layer, including the layer of photo-oriented polymer and the layer of liquid crystal polymer and dichroic dyes, form an anisotropic film, where the orientations of the layers composing the polarized layer, are correlated.

The article of the invention includes an abrasion-resistant coating, disposed over the polarized layer. This abrasion-resistant coating may be a monolayer or a multilayer comprising from 2 to 4 layers, and preferentially it is selected from a monolayer and a bi-layer.

According to a preferred embodiment of the invention, the polarized and abrasion-resistant article comprises an abrasion-resistant monolayer or bi-layer applied to the LCP layer on said article, optionally with a treatment of the said article, said treatment being selected from a chemical, thermal, corona and plasma treatment. In a advantageous embodiment of the invention, the said treatment is selected from chemical, thermal and corona treatment. In an embodiment of the invention, the said treatment is applied directly on the substrate of the article prior to the application of the photo-orientation layer on the said substrate; in another embodiment, the said treatment is applied on the article after the LCP layer is applied on the said article. In a more advantageous embodiment of the invention, the said treatment is a thermal treatment which is applied on the article after the LCP layer is applied and prior to the application of the abrasion-resistant bi-layer. In another advantageous embodiment of the invention, the said treatment is a chemical treatment, which is applied directly on the substrate of said article, prior to the application of photo-orientation layer on the substrate.

These treatments may be of interest for a good adhesion of the stack (photo-orientation layer, LCP layer, and abrasion-resistant layer) on the substrate of the article. The choice of the type of treatment may depend on the nature of the photo-orientation layer and on the nature of the abrasion-resistant layer.

Suitable abrasion-resistant monolayer is selected from sol-gel coating and polymerizable UV coating like polymerizable (meth)acrylic or epoxy(meth)acrylic monomers, which may optionally comprise glymo(3-glycidoxypropyltrimethoxysilan). More specifically, suitable abrasion-resistant monolayers are made of the composition described in EP 0 614 957 B1, U.S. Pat. No. 5,619,288, and EP 1 301 560, which are incorporated herewith by reference.

Surprisingly, the Applicants have established that the further coating or covering onto the substrate of an abrasion resistant layer, overlaying the polarized layer, may ensure a better adherence of the polarized layer onto the substrate.

Furthermore, the Applicants have observed that the intensity and the dose of the light used to polymerise and orient the polarized coating may play an important part to obtain a satisfactory polarized and abrasion-resistant article. Satisfactory polarized and abrasion-resistant article means an article wherein the polarized coating and the abrasion-resistant coating exhibit a good adhesion onto the substrate which constitutes the support of said article, and good optical properties. Finally, the Applicants have observed that the type of treatment used on the article prior to the application of the stack or after the application of the photo-orientation layer and of the LCP layer may play also an important part to obtain a satisfactory polarized and abrasion-resistant article as defined herein-above.

DETAILED DESCRIPTION OF THE PREFERRED EMBODIMENT

In a preferred embodiment of the invention suitable said abrasion-resistant monolayer results from the application of an anti-abrasion composition based either on aluminum and silane hydrolysates, or UV polymerizable monomers like (meth)acrylic, epoxy, epoxy(meth)acrylic and a mixture of them. Such last compounds are commercialized by Ultra Optics under the reference (UV-NV).

The abrasion-resistant monolayer may be those comprising as the main constituents an epoxyalkoxysilane such as, for example, γ-glycidoxypropyltrimethoxysilane (GLYMO) and optionally a dialkyldialkoxysilane such as, for example, dimethyldiethoxysilane (DMDES), colloidal silica and a catalyst amount of a curing catalyst such as aluminum acetylacetonate or a hydrolysate thereof, the remaining of the composition being essentially comprised of solvents typically used for formulating these compositions.

According to a preferred embodiment of the invention, the abrasion-resistant monolayer is made using the composition described in claim 8 of EP 0 614 957 B1 and more preferably using the composition described through example 3 of the said referenced patent, which composition is based on aluminium and silane hydrolysates. This formulation of the abrasion-resistant coating is only given as example and does not limit in any way the present invention to the use of the said coating.

Suitable abrasion-resistant bi-layer contains a first layer directly in contact with the LCP layer, which abrasion-resistant layer may include a primer latex layer comprising urethane function, or comprising (meth)acrylic function or comprising butadiene units and a second layer which may be identical to the abrasion-resistant above-mentioned monolayer. Suitable latex layer is preferably made of the composition described respectively in the following patents: U.S. Pat. Nos. 5,316,791, 6,503,631 and 6,489,028, incorporated herewith by reference. It is also possible to use as primer latex a photochromic latex as described in EP 1 161 512 and FR 2 811 322. More preferably, the primer latex layer used in the present invention is an aqueous dispersion of polyurethane and particularly preferred commercially available aqueous polyurethane dispersions include W-240 and W-234 (Baxenden™). According to a preferred embodiment of the invention the abrasion-resistant bi-layer coating comprises a first layer which is the preferred primer latex layer described hereinbefore, and preferably an aqueous dispersion of polyurethane, and a second layer which is the preferred abrasion-resistant monolayer described hereinbefore. It is well understood according to the invention that the said first layer is directly in contact with the (LCP) layer of the polarized layer applied to the substrate of the article.

According to a particular embodiment of the invention, before having the liquid crystal layer (LCP) coated with the abrasion-resistant layer, a treatment of said LCP layer is performed. This treatment is selected from chemical, thermal, corona and plasma treatment. In a preferred embodiment, this treatment is a thermal treatment.

According to another particular embodiment of the invention, before having the photo-orientation layer coated with the substrate of the article, a treatment of said substrate is performed. This treatment is selected from chemical, thermal corona and plasma. In a preferred embodiment this treatment is a chemical treatment.

The chemical treatment may comprise the steps of:
  dipping successively the article in a bath at 50° C. and containing a 5% NaOH aqueous solution; then in a bath of water, then in a bath of deionised water;
  drying the article.

Optionally, when the chemical treatment is performed before the liquid crystal layer (LCP) coated with the abrasion-resistant monolayer, the chemical treatment may comprise the steps of:
  dipping successively the article in a bath at 50° C. and containing a 5% NaOH aqueous solution; then in a bath of water, then in a bath of deionised water;

dipping the article in a bath containing isopropylalcohol; and drying the article.

The thermal treatment usually comprises the heating of the article for 5 minutes to 3 hours at a temperature comprised from 50° C. to 130° C., and preferentially for 1 hour at 100° C. It is also possible to heat the said article for a short time using the usual fast-cure process. In such heating step, the temperature may be greater than 100° C., preferentially greater than 130° C. but normally less than 200° C.

The corona treatment comprises the application, by means of an electrode, of a high electrical discharge at normal pressure on the substrate.

The plasma treatment is similar to the corona treatment but it is used under high vacuum or inert atmosphere. It is also possible to use it under normal pressure.

Preferably, the substrate is an organic material, more preferably an organic lens. According to a preferred embodiment of the invention, the substrate is an optic glass or an optical lens which is selected from ophthalmic lens, ocular visor, and sight optical systems. In a preferred embodiment, the substrate is an ophthalmic lens which may be an afocal, a unifocal, a bifocal, a trifocal or a progressive lens. Each ophthalmic lens may be also transparent, solar, or photochromic. In such case, the substrate coated with the polarized layer and the abrasion-resistant coating may be overcoated with classical properties enhancing coatings such as anti-reflecting coating and top coat. Anti-reflecting coatings and their methods of making are well known in the art. The top coat, typically a hydrophobic top coat, which in the finished optical article constitutes the outermost coating on the optical substrate, is intended for improving the dirty mark resistance of the finished optical article.

The layers may be applied either to the convex or to the concave side of the lens, or on the two sides. It is though preferred that the polarized layer is applied to the convex side of the lens, in order to avoid polarization deviation due to birefringence of the substrate. In a preferred embodiment of the invention, the polarized layer is spin-coated on the convex side of the lens, and the abrasion-resistant coating is dip-coated on convex and concave sides.

The invention also relates to a process for manufacturing a polarized and abrasion-resistant article comprising the steps of preparing a liquid crystal solution including dyes and at least one dichroic dye, applying said solution to a substrate possibly already having coatings on it, orienting the liquid crystal layer by means of a photo-alignment layer, retaining said orientation preferably by cross-linking and applying a further abrasion-resistant coating on the substrate.

According to the process of the invention, the polarized layer is made or applied, for example by spin-coating or dip-coating, onto the substrate, and the abrasion-resistant layer is a further layer, overlaying the polarized layer. Coating steps like spin, dip, flow, fan-coater or spray, and particularly spin-coating and dip-coating steps, are easy to perform, and therefore the process of the invention is industrially cost effective and practical to operate.

According to a particular embodiment, the process of the invention includes the steps of coating a photo-alignment material solution, said photo-alignment material solution optionally comprising additives, onto the said substrate to form a layer, then applying polarized UV radiation on said layer, then coating a liquid crystal monomers solution, comprising one or more dyes of which at least one is dichroic and optionally additives, onto the former layer and cross-linking the obtained new layer (LCP) using a UV light source; treating the surface of the (LCP) layer with chemical solutions, corona treatment, thermal treatment and/or plasma treatment, each of these treatments being followed by a rinsing step; and coating an abrasion-resistant coating onto the resulting treated layer. According to a preferred embodiment the process of the invention is as described hereinbefore wherein the treatment of the surface of the (LCP) layer is a thermal treatment.

According to another particular embodiment, the process of the invention includes the steps of: treating the surface of the substrate of the article with chemical solutions, corona treatment, and/or thermal treatment, each of these treatment being followed by a rinsing step; coating a photo-alignment material solution, said photo-alignment material solution optionally comprising additives, onto the said substrate to form a layer; then, applying polarized UV radiation on said layer; then, coating a liquid crystal monomers solution, comprising one or more dyes of which at least one is dichroic and optionally additives, onto the former layer and cross-linking the obtained new layer (LCP) using a UV light source; and coating an abrasion-resistant coating onto the resulting treated layer. According to a preferred embodiment the process of the invention is as described hereinbefore wherein the step of treatment of the surface of the substrate is a chemical treatment.

According to a preferred embodiment, the process of the invention comprises the steps of:

a) washing several times the substrate with basic solutions and water, followed by a treatment selected from chemical, corona, thermal, and plasma, b) coating a photo-alignment material solution, said photo-alignment material solution optionally comprising additives, onto the said substrate to form a layer, then applying polarized UV radiation on said layer, this application having the effect of orienting the photo-alignment layer, for example in the incident UV light polarisation axis;

c) coating a liquid crystal monomers solution, comprising one or more dyes of which at least one is dichroic and optionally additives, onto the layer of step b), then cross-linking the obtained new layer (LCP) using a UV light source;

d) treating the surface of the (LCP) layer of step c), with at least one treatment selected from chemical solutions, corona, thermal and plasma, each of these treatments being followed by a rinsing step; and e) coating an abrasion-resistant coating onto the treated layer resulting of step d).

According to the invention the coating steps in the steps b), c) and e) of the manufacturing process may be obtained by a method selected from spin, dip, fan-coater, and spray. In a preferred embodiment of the invention, steps b) and c) of the manufacturing process are spin-coating steps. Advantageously, step e) is spin-coating or dip-coating.

According to the invention, the rinsing step in the step d) of the manufacturing process may be a simple step of rinsing with water or alcohol, or a rinsing step using basic or acid solution, or surfactant compounds.

According to an embodiment of the invention, the orientation of the liquid crystal layer involves the following photo-alignment technique: an orientation layer is obtained by irradiation with polarized light of a linearly photo-orientable material having photoreactive groups. According to a particular embodiment of the invention, the photo-orientation layer results from the spin coating onto the substrate of a solution comprising the photo-alignment material, preferably in a concentration comprised from 0.5 to 10%, and more preferably from 1% to 4% in a suitable solvent, such as for example anisole, cyclopentanone, cyclohexanone, acetone, methylethylketone (MEK), MPK, NMP, DMF, DMA, ethylacetate, butylacetate, dioxane, diethylene glycol dimethyl ether, dichloromethane or a mixture thereof. Preferably, the linearly photo-orientable material forming the photo-orientation layer is an acrylic or methacrylic polymer, or polyimides or dendrimers. Advantageously, the photo-orientable polymer has cinnamic acid derivatives, chalcones or coumarines as photoreactive groups, and may also present (meth)acrylate backbones. Suitable photo-orientation materials used in the present invention are more particularly described in patent EP 0 763 552. The spin velocity during the spin coating is comprised from 400 to 3500 rpm and preferably from 1500 to 2500 rpm. Then, the layer may be optionally dried. The drying time for the layer may be comprised from 1 to 60 minutes and preferably from 3 to 30 minutes, and is chosen at a temperature allowing eliminating solvent(s). This temperature is usually comprised between 50° C. and 130° C. It is also possible to use fast-cure process to dry the layer, preferably during less than 5 minutes and more preferably during from few seconds to 2 minutes and the temperature may be greater than 100° C., but normally not greater than 200° C. The drying step is followed by a photo-polymerisation retaining the orientation, usually made through an exposure of the layer to polarized UV light, with a dose preferably comprised between 5 and 300 mJ/cm$^2$.

According to the invention, a layer comprising liquid crystals, one or more dyes of which at least one is dichroic, and optionally additives is applied onto the orientation layer. This liquid crystal layer is obtained from a solution of liquid crystal monomers. Suitable liquid crystal layer used in the present invention are more particularly described in the international patent application WO00/55110. This layer is applied onto the orientation layer and in contact with the orientation layer which has the functionality to give an orientation to the liquid crystals layer. This orientation of the liquid crystals is fixed by the photo-orientable layer itself or preferably, by a successive cross-linking. This cross-linking is carried out through a UV radiation exposure. According to the invention the intensity of the UV light source ranges from 1 to 200 mW/cm$^2$, and preferably from 2 to 100 mW/cm$^2$, and the dose of UV light ranges from 0.2 J/cm$^2$ to 30 J/cm$^2$.

According to a preferred embodiment, dyes are dichroic dyes which may be selected, each independently, from polymerizable and unpolymerizable dichroic dyes. For example, suitable dichroic dyes used in the present invention are more particularly described in the patent application WO 2004/085547. The said dichroic dyes are mixed with the liquid crystal monomers solution and aligned parallel to the liquid crystal monomers when oriented. This embodiment allows the construction of locally-structured dichroic filters and dichroic polarizer. According to an advantageous embodiment of the invention, the dichroic dyes are polymerizable.

Dichroic dye molecules are particularly suitable when they have a functional group enabling the dye to be incorporated in the polymer network, for example, dyes comprising a (meth) acrylate head group are advantageously incorporated into a network of liquid crystal di(meth)acrylates. Preferred dichroic dyes according to this invention have a high dichroic ratio, a high order parameter, show a bright colour, have a high extinction coefficient, and have a good solubility. Those dichroic dyes can be azoic dyes, perylenes, anthraquinones, phenoxazines. Azoic dyes are particularly preferred because they show an excellent compatibility with the liquid crystals, and also because the transition moment of the azoic dyes are along their long molecular axis. One other advantage of the azoic dyes is that they can be easily prepared.

According to an embodiment of the invention the above mentioned step c) comprises the following steps:
preparing a liquid crystal solution containing from 1 to 20% by weight of dichroic dyes, and preferentially 7 to 15% by weight (it is understood that the percentages are based on the weight of dry material);
spin-coating this solution onto the photo-orientation layer obtained in step b);
drying-annealing the said layer at a temperature comprised from 40 to 120° C. for a time of 2 to 60 minutes; and
cross-linking the said layer under inert atmosphere by irradiation under UV light source which presents an intensity comprised from 1 to 200 mW/cm$^2$, and preferably from 2 to 100 mW/cm$^2$ and a dose comprised from 0.2 J/cm$^2$ to 30 J/cm$^2$.

According to a particular embodiment of the invention, the liquid crystal layer results from the spin coating of a solution comprising liquid crystal molecules and dichroic dyes in a solvent suitable for solubilizing both liquid crystals and dichroic dyes and the possible other components present in this solution. Examples of suitable solvents are anisole, cyclopentanone, cyclohexanone, acetone, methylethylketone (MEK), MPK, NMP, DMF, DMA, ethylacetate, butylacetate, dioxane, diethylene glycol dimethyl ether, dichloromethane or a mixture thereof. Preferred solvents are cyclohexanone or a mixture selected from anisole/acetone, anisole/ethylacetate and anisole/cyclopentanone in quantities of 85:15 to 50:50 in weight. The quantity of solid material in the solvent is typically comprised from 5 to 50% by weight and preferentially from 10 to 45%. The quantity of dichroic dyes, related to the solid mixture of liquid crystal and dichroic dyes is comprised from 1 to 20% by weight and preferentially from 7 to 15% by weight. The quantities of liquid crystal and dichroic dyes are adjusted to obtain the desirable tinting, transmissive rate, and the polarisation efficiency required for the final product. The spinning may be made, for example, at a velocity comprised from 300 to 3000 rpm during 20 seconds to 10 minutes. The drying-annealing time may be from about 2 to 60 minutes at a temperature comprised between 40 and 120° C.

This drying-annealing step allows the evaporation of the solvents and perfects the organization of the liquid crystal and dichroic dyes along the preferred direction inducted in the LPP layer.

After the drying-annealing step, the layer is cross-linked under inert atmosphere, by irradiation under UV using an intensity of UV light source comprised from 1 to 200 mW/cm$^2$, and preferably from 2 to 100 mW/cm$^2$, and a dose comprised from 0.2 J/cm$^2$ to 30 J/cm$^2$.

This invention is also directed to the use of a polarized and abrasion-resistant article according to the invention for the manufacturing of eye-wear products, aiming tools, window panels, windshields or glasses, especially organic glasses. More particularly the present invention is directed to the use of polarized and abrasion-resistant articles according to the invention for the manufacturing of ophthalmic lenses and ocular visors.

The following examples refer to particular embodiments of the invention and shall not be interpreted as limiting the scope of this invention.

Examples 1

The polarized layer was applied to an ORMA® lens with a central thickness of 2 mm.
1) Preparation of a Linearly Photo-polymerized Layer
The surface of a glass is activated by a plasma treatment in the following typical conditions: power 600 W during 3 minutes, gas medium is a mixture oxygen:argon (50:50). A solution with 2% in weight of an acrylic polymer having pending strains of cinnamic acid derivates is prepared in methylethylketone. This solution is disposed by spin-rotation onto the activated substrate rotation speed is 2000 rpm during 1 min. The solvent is evaporated by heating on a hotplate during 20 minutes at 130° C. A photo-alignment layer of thickness 50 nm is obtained. This layer is irradiated during 30 seconds under polarized UV, at a dose of 100 mJ/cm$^2$.

2) Preparation of a Layer of Liquid Crystals and Dichroic Dyes.

A solution containing liquid crystal molecules and dichroic dyes is prepared in a mixture of anisole:acetone (50:50). The solid content of this solution is typically 40% in weight. The quantity of polymerizable dichroic dyes in the solution is of about 10% in weight. This solution is spin-coated onto the photo-alignment layer (rotation 450 rpm during 2 minutes then 2000 rpm during 5 seconds). The new layer is dried during about 10 nm at a temperature of 87° C. After evaporation of the solvents, this layer is cross-linked by irradiation with a UV light source having an intensity of 5 mW/cm$^2$ and a dose of 5 J/cm$^2$.

3) Preparation of the Abrasion-resistant Layer a) Abrasion-resistant Monolayer:

The abrasion-resistant monolayer is made according to example 3 of the patent EP 0 614 957 B1. This layer comprised, with respect to the total weight of the composition, 22% of glycidoxypropylmethyldimethoxysilane, 62% of colloidal silica, containing 30% solids in methanol, and 0.70% of aluminum acetylacetonate (a catalyst), the balance essentially consisting of water and conventional solvents. This abrasion-resistant monolayer was deposited on both faces of the lens by dip coating and cured 3 hours at 100° C. The thickness of the layer is 3.5 µm.

b) Abrasion-resistant Bi-layer:

The abrasion-resistant bi-layer is made using the following step:

firstly the primer latex layer is obtained in accordance with the protocol described in example 1 of U.S. Pat. No. 5,316,791 and using the commercially available W-240 aqueous dispersion of polyurethane as a substrate. This over-layer is deposited by dip-coating and then is cured at 85° C. for 4 minutes; the thickness of the layer is 1 µm;

secondly a deposited onto layer as described in the above §3)a) is the primer latex with the same experimental conditions.

4) Cross Hatch Test:

This test is used to evaluate the adhesion of coating(s) on lenses. It is in accord with the norm NF T 30-038 standard: "Grid test for paint and varnish foils".

The abrasion-resistant coating of a lens is incised with a cutting tool, making a grid. Five pieces of adhesive tape are successively placed on the grid and then pulled off. The assessment of the test is made by visual inspection of the squares (eventually with an arc lamp) and it is defined if coating(s) remain(s) or not on the substrate.

5) Results

Using the process steps 1), 2) and 3), many polarized and abrasion-resistant articles have been prepared and tested under the condition described in the above chapter 4).

article 1 (A1) comprised:
A polarized layer as described in the preceding steps 1) and 2);
An abrasion-resistant monolayer as described in the preceding step 3)a).

article 2 (A2) comprised:
A polarized layer as described in the preceeding steps 1) and 2);
An abrasion-resistant bi-layer as described in the preceeding step 3)b).

article 3 (A3) comprised:
A polarized layer as described in the preceeding steps 1) and 2) but in which the (LCP) layer contains one unpolymerizable dichroic dye;
An abrasion-resistant monolayer as described in the preceding step 3)a).

article 4 (A4) comprised:
A polarized layer as described in the preceeding steps 1) and 2) but in which the (LCP) layer contains one unpolymerizable dichroic dye;
An abrasion-resistant bi-layer as described in the preceding step 3)b).

article 5 (A5) comprised:
A polarized layer as described in the preceding steps 1) and 2) but in which the (LCP) layer is irradiated and cross-linked using an UV light source with an intensity of 60 mW/cm$^2$ and a dose of 10 J/cm$^2$;
An abrasion-resistant monolayer as described in the preceding step 3)a).

article 6 (A6) comprised:
A polarized layer as described in the preceeding steps 1) and 2) but in which the (LCP) layer is irradiated and cross-linked using an UV light source with an intensity of 60 mW/cm$^2$ and a dose of 10 J/cm$^2$;
An abrasion-resistant bi-layer as described in the preceding step 3)b).

article 7 (A7) comprised:
A polarized layer as described in the preceding steps 1) and 2)
An abrasion-resistant monolayer which is a UV polymerizable monolayer commercialized by Ultra Optics under the name (UV-NV).

| Article | Chemical Treatment | Thermal Treatment | Corona Treatment |
|---------|--------------------|--------------------|------------------|
| A1 | (−) | (−) | (−) |
| A2 | (−) | (−) | (+) |
| A3 | (−) | (+) | (−) |
| A4 | (−) | (−) | (+) |
| A5 | (−) | (−) | (+) |
| A6 | (+) | (+) | (+) |
| A7 | (+) | nt | nt |

* Chemical treatment: successively dipping in the following solution: NaOH 5% at 50° C./water/deionised water/(optionally isopropylalcohol for anti-abrasion monolayer). For article (A7) the chemical treatment is only a dipping step in water.
* Thermal treatment: heating 3 hours at 100° C.
* Corona treatment: using one electrode in which the tension is 2*8 kV.
* nt: not tested.

6) Abrasion-resistance

Abrasion-resistance was determined using the steel wool test which is conducted as follows:

The lens was mounted coated surface up with double sided tape on the end of a one inch (2.54 cm) diameter pivoting rod. Steel wool (000 grade) was then pressed against the coated surface with a five pounds (2.267 kg) weight as back-pressure. The lens was then oscillated for 200 cycles against the steel wool and the haze was measured. The difference in haze (final-initial) as measured on a Pacific Scientific Hazemeter model XL-211 is reported as the steel wool scratch resistance value.

All articles in which the abrasion-resistant coating adheres onto the article exhibit satisfactory result under steel wool test.

Example 2

The polarized layer was applied to a lens made of polythiourethane material. The preferred polythiol is the 1,2-bis(2'-mercaptoethylthio)-3-mercaptopropane (MDO). The preferred isocyanate is the m-xylylene diisocyanate.

1) Preparation of a Linearly Photo-polymerized Layer

The high index lens is washed in a NaOH (5%) solution at 55° C. with ultrasonics. It is then dipped in water and deionised water (optionally isopropylalcohol). A solution with 2% in weight of an acrylic polymer having pending strains of cinnamic acid derivatives prepared in a mixture of methylethylketone and cyclopentanone (10:1). This solution is disposed by spin rotation onto the substrate. The rotation speed is 500 rpm during 3 seconds and then 2500 rpm during 20 seconds. The solvent is evaporated by heating in an oven during 20 minutes at 100° C. A photo-alignment layer of thickness 150 nm is obtained. This layer is irradiated under polarized UV at a dose of 100 mJ/cm$^2$.

2) Preparation of a Layer of Liquid Crystals and Dichroic Dyes.

A solution containing liquid crystal molecules and dichroic dyes is prepared in cyclohexanone. The solid content of this solution is typically 40% in weight. The quantity of dichroic dye is of about 10% in weight. This solution is spin-coated onto the photo-alignment layer (rotation 500 rpm during 25 seconds). The new layer is dried during about 10 minutes at a temperature of 87° C. After evaporation of the solvents, this layer is cross-linked under nitrogen atmosphere by irradiation with a UV light source at a dose of 30 J/cm$^2$.

3) Preparation of the Abrasion-resistant Bi-layer

This layer is described using the process described in example 1.

4) Results

Article (B1): proceeding 1), 2), 3) bilayer and crosslinkable dye

Article (B2): proceeding 1), 2), and 3) as (B1) but UV dose of 5 J/cm$^2$.

Article (B2) presents best result under the Cross Hatch Test than Article (B1).

All articles in which the abrasion-resistant coating adheres onto the article exhibit satisfactory result under steel wool test.

The invention claimed is:

1. A method for manufacturing a polarized and abrasion-resistant optical article comprising
an optical substrate,
a polarized layer, said polarizer layer including a photo-alignment layer and, on said photo-alignment layer, an oriented liquid crystal polymer (LCP) layer comprising one or more dyes of which at least one is a dichroic dye, and
an abrasion-resistant monolayer or multilayer overlaying the polarized layer, said method comprising the steps of:
a) submitting the surface of the substrate to a chemical treatment comprising the step of dipping the article in a 5% NaOH aqueous solution at 50° C., followed by a rinsing step with water, and drying;
b) coating a photo-alignment material solution onto the substrate to form a layer, then applying polarized UV radiation on said layer, this application having the effect of orienting the layer thereby forming a photo-alignment layer;
c) coating, onto the photo-alignment layer of step b), a liquid crystal monomer solution, comprising one or more dyes of which at least one is a dichroic dye, then cross-linking the obtained new layer using a UV light source to obtain a liquid crystal polymer (LCP) layer;
d) submitting the surface of the LCP layer of step c) to a thermal treatment comprising heating the article for 5 minutes to 3 hours at a temperature comprised between 50° C. and 130° C.; and
e) coating an abrasion-resistant layer onto the heat treated layer resulting from step d).

2. The method according to claim 1, wherein the coating of the photo-alignment material solution, of the liquid crystal monomer solution, and of the abrasion-resistant layer is obtained by a method selected from the group consisting of spin coating, dip coating, fan-coating, and spray coating.

3. The method according to claim 2, wherein the coating of the photo-alignment layer and of the liquid crystal monomer solution are spin-coating steps, and the coating of the abrasion-resistant layer is a spin-coating or dip-coating step.

4. The method according to claim 1, wherein step b) comprises:
spin-coating the photo-alignment material solution onto the substrate to obtain a layer;
drying said layer at a temperature of from 50° to 130° C. for a time of from 3 to 30 minutes;
photopolymerizing the dry layer using polarized UV light with a dose from 5 to 300 mJ/cm$^2$.

5. The method according to claim 1, wherein step c) comprises:
preparing a liquid crystal monomer solution containing from 1 to 20% by weight of dichroic dyes;
spin-coating this solution onto the photo-alignment layer obtained in step b);
drying-annealing the said layer at a temperature comprised from 40 to 120° C. for a time of 2 to 60 minutes; and
cross-linking the said layer under inert atmosphere by irradiation with a UV light source which presents an intensity of from 2 to 100 mW/cm$^2$ and with a dose of from 0.2 J/cm$^2$ to 30 J/cm$^2$.

6. A method according to claim 1, wherein the photo-alignment material of step b) is an acrylic or methacrylic polymer having cinnamic acid derived photoreactive groups.

7. A method according to claim 1, wherein the at least one dichroic dye is a polymerizable dichroic dye.

8. The method according to claim 1, wherein the optical article is an ophthalmic lens the substrate of said ophthalmic lens being a mineral glass or an organic glass made of polymers selected from the group consisting of polycarbonates, polyamides, polyimides, polysulfones, copolymers of polyethyleneterephtalate and polycarbonate, polyolefines, polymers and copolymers of diethylene glycol bis(allylcarbonate), polymers and copolymers of bisphenol-A-(meth)acrylic, polymers and copolymers of thio(meth)acrylic, polymers and copolymers of urethane and thiourethane, polymers and copolymers of epoxy, and polymers and copolymers of episulfure.

9. The method according to claim 1, wherein said abrasion-resistant layer is a monolayer selected from sol-gel abrasion-resistant coatings and UV polymerizable abrasion-resistant coatings.

10. The method according to claim 9, wherein said abrasion-resistant monolayer results from the application of an anti-abrasion composition based on aluminium and silane hydrolysates.

11. The method according to claim 1, wherein the abrasion-resistant layer is a bi-layer which comprises:

a first layer directly in contact with the LCP layer, said first layer comprising a primer latex layer comprising functions selected from urethane, (meth)acrylic and butadiene, a second layer resulting from the application of an anti-abrasion composition based on aluminium and silane hydrolysates.

12. A method according to claim 1, wherein the polarized layer has a thickness of from 3 to 8 μm.

* * * * *